United States Patent [19]
Goralski et al.

[11] 3,865,822
[45] Feb. 11, 1975

[54] 1,1-DIHALO-1-(METHYLSULFONYL)ME-THANESULFONAMIDES

[75] Inventors: Christian T. Goralski; Thomas C. Klingler, both of Midland, Mich.

[73] Assignee: The Dow Chemical Company, Midland, Mich.

[22] Filed: Jan. 10, 1973

[21] Appl. No.: 322,434

[52] U.S. Cl.............. 260/247.1 R, 260/293.85, 260/326.82, 260/556 A, 424/248, 424/267, 424/274, 424/321
[51] Int. Cl.................. C07d 87/48, C07d 29/34, C07c 143/74
[58] Field of Search........ 260/556 A, 247.1, 326.82, 260/293.85

[56] References Cited
UNITED STATES PATENTS
3,641,033  2/1972  Levine.......................... 260/294.8 F
3,766,172  10/1973  Phillips........................ 260/239 BF Primary Examiner—Lorraine A. Weinberger
Assistant Examiner—Michael Shippen
Attorney, Agent, or Firm—Theodore Post; C. Kenneth Bjork

[57] ABSTRACT

The compounds of the formula $$CH_3SO_2CX_2SO_2NR_1R_2$$

in which X is chloro or bromo and $R_1$ and $R_2$ independently are hydrogen, 1 to 16 carbon atom alkyl, phenyl or substituted phenyl and together with the nitrogen atom represent a heterocycle which may contain an oxygen atom or another nitrogen atom in the heterocycle. The compounds are prepared by reacting the corresponding 1-(methylsulfonyl)methanesulfonamide with alkali metal hypohalite in the presence of an organic solvent. The compounds have antimicrobial acitvity.

9 Claims, No Drawings

1,1-DIHALO-1-(METHYLSULFONYL)ME-THANESULFONAMIDES

SUMMARY OF THE INVENTION

This invention concerns compounds represented by the formula $$CH_3SO_2CX_2SO_2NR_1R_2$$

wherein X represents chloro or bromo and $R_1$ and $R_2$ independently represent hydrogen, 1 to 16 carbon atom alkyl, i.e., from 1, to 2, to 3, to 4, to 5, to 6, to 7, to 8, to 9, to 10, to 11, to 12, to 13, to 14, to 15, to 16 carbon atom alkyl, phenyl or substituted phenyl and together with the nitrogen atom represent a heterocycle which may contain an oxygen atom in the heterocycle. In the specification and claims, "substituted phenyl" represents phenyl having lower alkyl, lower alkoxy, chloro or bromo substitution; the term "heterocyclic ring" designates a pyrrolidinyl, morpholinyl or a piperdinyl heterocyclic ring system; and "lower alkyl" and "lower alkoxy" represent 1 to 4 carbon alkyl and alkoxy groups, respectively.

The compounds of the invention are prepared by mixing a corresponding 1-(methylsulfonyl)methanesulfonamide with an alkali metal hypochlorite or hypobromite, advantageously formed in situ from an alkali metal hydroxide and chlorine or bromine in substantially 2 molar proportions of the halogen to 1 molar proportion of the 1-(methulsulfonyl)-methanesulfonamide in aqueous medium, advantageously in the presence of a solvent for the sulfonamide, i.e., dioxane or other waste-miscible ether. Reaction is allowed to proceed for about 30 minutes to about 1 hour at substantially 5° to 40°C. The product is separated from the reaction medium and recrystallized from a lower alkanol, preferably methanol or ethanol.

In practice, the 1-(methylsulfonyl)methanesulfonamide is slurried in a solvent such as dioxane or other water-miscible ether and to it is added aqueous alkali metal hydroxide, the resulting solution is cooled in an ice bath and bromine added thereto dropwise. After a short reaction time of about 30 minutes, the solvent is removed in vacuo and the solid product is filtered off and recrystallized from methanol or ethanol. Alternatively, the 1-(methylsulfonyl)methanesulfonamide is added to an aqueous solution of sodium hydroxide maintained at about 5°C. and to it is gradually added bromine with stirring, continued for about 30 minutes at about 5° to 10°C. The product is taken up in hot methanol or ethanol, cooled to about room temperature, filtered and recrystallized. In another alternative, the 1-(methylsulfonyl)methanesufonamide is dissolved in a solvent such as dioxane and to it a requisite amount of aqueous 5 percent sodium hypochlorite or sodium hypobromite is added. After a short reaction time of about 30 minutes, the solution is acidified with concentrated mineral acid, advantageously the corresponding hydrohalic acid, the solvent is removed in vacuo, the crude product slurried in aqueous methanol or ethanol, filtered and the purified product crystallized out.

The following examples describe representative specific embodiments and the best modes contemplated by the inventors of carrying out their invention. In the examples, temperature is given in centigrade degrees. The compounds are identified by elemental analysis and by nuclear magnetic resonance.

EXAMPLE 1

1,1-Dibromo-1-(methylsulfonyl)methanesulfonamide

In a solution of 2.51 g. of sodium hydroxide in 50 ml. of water dissolve 5 g. (29 mmol) of 1-(methylsulfonyl)-methanesulfonamide. Cool to 5°C. and add 9.0 g. (60 mmol) of bromine dropwise with stirring. After 20 minutes, the dibromo product is filtered off and dried to give 6.43 g. (67 percent yield) of white crystals. The product is recrystallized from 50 percent aqueous methanol; m.p. 232°–233°C. (dec.).

Anal. Calcd. for $C_2H_5Br_2NO_4S$: C, 7.26; H, 1.52; Br, 48.28; N, 4.23; S, 19.37. Found: C, 7.65; H, 1.52; Br, 48.7±0.2; N, 4.58; S, 19.81.

EXAMPLE 2

1,1-Dibromo-N-methyl-1-(methylsulfonyl)methanesulfonamide

A solution of 4.32 g. (0.108 mol) of sodium hydroxide in 150 ml. of water is cooled to 3°C. and 10 g. (0.0535 mol) of N-methyl-1-(methylsulfonyl)methanesulfonamide dissolved in it. Then add dropwise 17.3 g. (0.108 mol) of bromine over a 15 minute period. After stirring for 15 minutes more, the product is filtered off. Recrystallization from aqueous methanol gives 15.74 g. (85.5 percent yield) of white crystals; m.p. 128°–129.5°C.

Anal. Calcd. for $C_3H_7Br_2NO_4S_2$: C, 10.44; H, 2.04; Br, 46.32; N, 4.06; S, 18.59. Found: C, 11.03; H, 1.96; Br, 47.0 ± 0.2; N, 4.34; S, 18.60.

EXAMPLE 3

1,1-Dibromo-N,N-dimethyl-2-(methylsulfonyl)-methanesulfonamide

A slurry of 5.0 g. (25 mmol) of N,N-dimethyl-1-(methylsulfonyl)methanesulfonamide, 40 ml. of water and 8.1 g. of bromine is cooled to 5°C. in an ice bath. A solution of 2.1 g. of sodium hydroxide in 30 ml. of water is then added dropwise, maintaining the temperature below 10°C. After an hour, the product is filtered off. The aqueous layer is extracted with chloroform to remove unreacted starting material. Recrystallization of the product from aqueous ethanol gives 6.76 g. (90 percent yield) of the dibromo product as white crystals, m.p. 119°–120°C.

Anal. Calcd. for $C_4H_9Br_2NO_4S_2$: C, 13.38; H, 2.53; N, 3.90; S, 17.86; Br, 44.51. Found: C, 13.90, 13.81; H, 2.55, 2.58; N, 4.15, 4.05; S, 17.97, 18.19; Br, 45 ± 2.

EXAMPLE 4

1,1-Dibromo-N-hexyl-1-(methylsulfonyl)methanesulfonamide

A solution of 3.2 g. of sodium hydroxide in 100 ml. of water is cooled to 2°C. and 10.0 g. (39 mmol) of N-hexyl-1-(methylsulfonyl)methanesulfonamide is added. Then 13.0 g. of bromine is added at 0°C. After 30 minutes the product is filtered off and recrystallized from aqueous ethanol to give 8.58 g. (53 percent yield) of waxy white crystals; m.p. 71.5°–73°C.

Anal. Calcd. for $C_8H_{17}Br_2NO_2S_2$: C, 23.14; H, 4.13; N, 3.37; S, 15.45; Br, 38.49. Found: C, 23.32; H, 4.00; N, 3.63; S, 16.12; Br, 38.2 ± 0.2.

EXAMPLE 5

1,1-Dibromo-N-dodecyl-1-(methylsulfonyl)methanesulfonamide

To a slurry of 10 g. (29.3 mmol) of N-dodecyl-1-(methylsulfonyl)methanesulfonamide in 150 ml. of dioxane is added 2.34 g. (58.6 mmol) of sodium hydroxide in 50 ml. of water. The resulting solution is cooled in an ice bath and 10.0 g. of bromine added thereto dropwise. After 30 minutes, the dioxane is removed in vacuo and the yellow solid filtered off. Recrystallization from ethanol gives 14.06 g. (96 percent yield) of white crystals, m.p. 77°–78°C.

Anal. Calcd. for $C_{14}H_{29}Br_2NO_4S_2$: C, 33.68; H, 5.85; N, 2.81; S, 12.84; Br, 32.00. Found: C, 34.20, 34.13; H, 5.91, 5.89; N, 3.04, 3.05; S, 13.43, 13.16; Br, 31.8 ± 0.2.

EXAMPLE 6

4-( (Dibromo(methylsulfonyl)methyl)sulfonyl)-morpholine

To a solution of 8.8 g. (0.22 mol) of sodium hydroxide in 500 ml. of water at 5°C. add 24.3 g. (0.1 mol) of 4-( ( (methylsulfonyl)methyl)sulfonyl)morpholine. Then add 40 g. (0.25 mol) of bromine and stir continuously for 30 minutes at 5°–10°C. The product is taken up in 1,600 ml. of hot ethanol and cooled to 25°C. Filtration removes unreacted starting material. The filtered solution is concentrated and chilled to give 15 g. of dibromo product (63 percent yield) as white needles; m.p. 125°–126°C.

Anal. Calcd. for $C_6H_{11}Br_2NO_5S_2$: C, 17.97; H, 2.76; N, 3.49; S, 15.99; Br, 39.84. Found: C, 18.18; H, 2.69; N, 3.67; S, 16.03; Br, 40.0 ± 0.2.

EXAMPLE 7

4-( (Dichloro(methysulfonyl)methyl)sulfonyl)-morpholine

1 Gram of 4-( ( (methylsulfonyl)methyl)sulfonyl)morpholine is dissolved in 100 ml. of dioxane and 25 ml. of 5 percent aqueous sodium hypochlorite is added. After 30 minutes the solution is acidified with concentrated HCl acid. The dioxane is removed in vacuo and the product washed with water to remove NaCl and recrystallized from absolute ethanol to give white crystals, m.p. 115°–117°C.

Anal. Calcd. for $C_6H_{11}Cl_2NO_5S_2$: C, 23.08; H, 3.55; Cl, 22.71; N, 4.49; S, 20.54. Found: C, 23.00; H, 3.51; Cl, 22.80; N, 4.55; S, 20.60.

EXAMPLE 8

1,1,2',4',6',-Pentabromo-1-(methylsulfonyl)-methanesulfonanilide

To a solution of 5 g. (0.125 mol) of sodium hydroxide in 250 ml. of water at 5°C. add 5 g. (0.02 mol) of 1-(methylsulfonyl)methanesulfonanilide. Then add 20 g. (0.125 mol) of bromine with vigorous stirring. After 18 hours the pink product is filtered off and recrystallized from chloroform/hexane to give a 49 percent yield of pinkish white crystals, m.p. 202°–203°C.

Anal. Calcd. for $C_8H_6Br_5NO_4S_2$: C, 14.93; H, 0.94; Br, 62.06; N, 2.17; S, 9.96. Found: C, 15.22; H, 1.04; Br, 61.3 ± 0.6; N, 2.35; S, 10.00.

EXAMPLE 9

1,1-Dibromo-N-methyl-1-(methylsulfonyl)methanesulfonanilide

To a solution of 10 g. (38 mmol) of N-methyl-1-(methylsulfonyl)methanesulfonanilide in 100 ml. of dioxane add 3.1 g. of sodium hydroxide (77.5 mmol) in 80 ml. of water. After 30 minutes add 12.4 g. (76 mmol) of bromine and stir for 63 hours. The product is filtered off and recrystallized from methanol to give 8.4 g. of fine white crystals; m.p. 150°–151.5°C.

Anal. Calcd. for $C_9H_{11}Br_2NO_4S_2$: C, 25.67; H, 2.63; N, 3.32; S, 15.23; Br, 37.95. Found: C, 25.63; H, 2.49; N, 3.39; S, 14.83, 14.89; Br, 39.5 ± 0.2.

EXAMPLE 10

1,1-Dibromo-1-(methylsulfonyl)-N,N-(diphenyl)-methanesulfonamide

To a solution of 10 g. (30.8 mmol) of N,N-diphenyl-1-(methylsulfonyl)methanesulfonamide, 2.46 g. of sodium hydroxide, 250 ml. of dioxane and 80 ml. of water add 10.4 g. (65 mmol) of bromine and stir for 3 hours. The solvent is removed in vacuo and the residue slurried with 300 ml. of water and filtered. Recrystallization of the product from 2 liters of ethanol gives 10.4 g. of white needles; m.p. 189°–190°C. (dec.).

Anal. Calcd. for $C_{14}H_{13}Br_2NO_4S_2$: C, 34.80; H, 2.71; N, 2.90; S, 13.27; Br, 33.07. Found: C, 34.91; H, 2.56; N, 3.00; S, 13.23; Br, 32.5 ± 0.2.

EXAMPLE 11

1-( (Dichloro(methylsulfonyl)methyl)sulfonyl)-piperidine

4 Grams of 1-( ( (methylsulfonyl)methyl)sulfonyl)-piperidine is dissolved in 200 ml. of dioxane and 100 ml. of 5 percent aqueous sodium hypochlorite is added. After 30 minutes the solution is acidified with concentrated HCl acid. The dioxane is removed in vacuo, the product washed with water to remove NaCl and recrystallized from absolute ethanol to give 2.77 g. of white crystals, m.p. 91°–93°C.

Anal. Calcd. for $C_7H_{13}Cl_2NO_4S_2$: C, 27.10; H, 4.22; Cl, 22.86; N, 4.51; S, 20.67. Found: C, 26.80; H, 4.05; Cl, 22.70; N, 4.46; S, 20.50.

The compounds of the invention are useful as antimicrobials for the control of bacteria, fungi and yeasts. For such uses, the compounds can be employed in an unmodified form or dispersed on a finely divided solid and employed as dusts. Such mixtures can also be dispersed in water with or without the aid of a surface-active agent and the resulting aqueous suspensions employed as sprays. In other procedures, the products can be employed as active constituents in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions. Good results are obtained when employing compositions containing antimicrobial concentrations and usually from about 100 to 1,000 parts by weight of one or more of the compounds per million parts of such compositions.

In representative operations, compounds of the present invention were tested for their activity as antimicrobials using conventional agar dilution tests. The following Table presents results expressed as ppm of toxicant of the examples to provide 100 percent growth inhibition of the indicated organisms.

TABLE I

MINIMUM GROWTH INHIBITORY CONCENTRATION, p.p.m.

| Example | Sa | Ca | Ec | Pa | St | Mp | Tm | Bs | Cp | Aa | Pp | Cf | Ci | Ts | At | Rn |
|---|---|---|---|---|---|---|---|---|---|---|---|---|---|---|---|---|
| 1 | 100 | 100 | 100 | 100 | 100 | 100 | 100 | 100 | 100 | 100 | 100 | 100 | 100 | 100 | 100 | 100 |
| 2 | 100 | 100 | 100 | 100 | 100 | 100 | 100 | 100 | 100 | 100 | 100 | 100 | 100 | 100 | 100 | 100 |
| 3 | 100 | 100 | 100 | 100 | 100 | 100 | 100 | 100 | 100 | 100 | 100 | 100 | 100 | 100 | 100 | 100 |
| 4 | 100 | 100 | 100 | 100 | 100 | 100 | 100 | 100 | 100 | 100 | 100 | 100 | 100 | 100 | 100 | 100 |
| 5 | 100 | 100 | 100 | 100 | 100 | 100 | 100 | 100 | 100 | 100 | 100 | 100 | 100 | 100 | 100 | 100 |
| 6 | 500 | 100 | 100 | 100 | 100 | 500 | 100 | 100 | 100 | 100 | 100 | 100 | 100 | 100 | 100 | 100 |
| 7 | 500 | 500 | 500 |  | 500 |  | 100 | 100 | 500 | 500 | 100 | 100 | 500 | 500 | 500 |  |
| 8 | 100 | 100 | 500 | 100 | 100 | 100 | 100 | 100 | 100 | 500 | 100 | 100 | 500 | 100 | 100 | 100 |
| 9 | 100 | 100 | 100 | 100 | 100 | 100 | 100 | 100 | 100 | 100 | 100 | 100 | 100 | 100 | 100 | 100 |
| 10 | 500 | 500 | 500 | 100 | 500 | 500 | 100 | 500 | 100 | 500 | 100 | 100 | 500 | 500 | 500 | 100 |

Sa = *S. aureus*
Ca = *C. albicans*
Ec = *E. coli*
Pa = *Pseudomonas aeruginosa*
St = *S. typhosa*
Mp = *M. phlei*
Tm = *T. mentagrophytes*
Bs = *B. subtilis*
Cp = *C. pelliculosa*
Aa = *A. aerogenes*
Pp = *P. pullulans*
Cf = *C. fragans*
Ci = *C. ips*
Ts = *Trichoderma Species P-42*
At = *A. terreus*
Rn = *R. nigricans*

The 1-(methylsulfonyl)methanesulfonamides are prepared by the procedure of G. Opitz e.a., Angew. Chem., Int. Ed, 5, 594 (1966).

What is claimed:

1. A compound represented by the formula $CH_3SO_2CX_2SO_2NR_1R_2$ wherein X represents chloro or bromo and $R_1$ and $R_2$ independently represent hydrogen or 1 to 16 carbon atom alkyl, and together with the nitrogen atom represent a pyrrolidinyl, piperidinyl or morpholinyl heterocycle.

2. The compound of claim 1 which is 1,1-dibromo-1-(methylsulfonyl)methanesulfonamide.

3. The compound of claim 1 which is 1,1-dibromo-N-methyl-1-(methylsulfonyl)methanesulfonamide.

4. The compound of claim 1 which is 1,1-dibromo-N,N-dimethyl-1-(methylsulfonyl)methanesulfonamide.

5. The compound of claim 1 which is 1,1-dibromo-N-hexyl-1-(methylsulfonyl)methanesulfonamide.

6. The compound of claim 1 which is 1,1-dibromo-N-dodecyl-1-(methylsulfonyl)methanesulfonamide.

7. The compound of claim 1 which is 4-((dibromo(methylsulfonyl)methyl)sulfonyl)morpholine.

8. The compound of claim 1 which is 4-((dichloro(methylsulfonyl)methyl)sulfonyl)morpholine.

9. The compound of claim 1 which is 1-((dichloro(methylsulfonyl)methyl)sulfonyl)piperidine.

* * * * *